(12) United States Patent
Kajita

(10) Patent No.: US 6,301,010 B1
(45) Date of Patent: Oct. 9, 2001

(54) IMAGE PROCESSING METHOD AND APPARATUS

(75) Inventor: Koji Kajita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/161,400

(22) Filed: Sep. 28, 1998

(30) Foreign Application Priority Data

Sep. 30, 1997 (JP) .................................................. 9-281142

(51) Int. Cl.[7] .................................................. G06K 15/00
(52) U.S. Cl. ................................................ 358/1.13; 358/1.1
(58) Field of Search ................................. 358/1.1, 1.2, 1.9, 358/1.13–1.14, 1.15, 1.16, 1.17, 448, 450, 530, 540; 710/8, 9, 14, 16, 15, 36, 40, 41, 52, 53, 56, 62, 72

(56) References Cited

U.S. PATENT DOCUMENTS

| 5,149,140 | * | 9/1992 | Mowry, Jr. et al. ................... 358/1.1 |
| 5,457,540 |   | 10/1995 | Kajita ..................................... 358/296 |
| 5,815,643 | * | 9/1998 | Van Deurzen et al. ............. 358/1.13 |

* cited by examiner

Primary Examiner—Arthur G. Evans
(74) Attorney, Agent, or Firm—Fitzpatrick, Cella, Harper & Scinto

(57) ABSTRACT

Input first image data and second image data are added with attribute data representing attributes of the respective data, the first and second image data respectively added with the attribute data are multiplexed, the attribute of the image data is analyzed based on the attribute data added to the multiplexed image data, and a first image process is performed to the first image data in the multiplexed image data and a second image process is performed to the second image data, in accordance with the analyzed attributes.

12 Claims, 5 Drawing Sheets

FIG.2

| HEADER LENGTH |
| --- |
| IMAGE LENGTH |
| IMAGE LENGTH |
| IMAGE KIND INFORMATION |
| IMAGE TYPE |
| DATE INFORMATION |
| COMMENT |
| COMMENT |
| COMMENT |
| COMMENT |
| COMMENT |
| COMMENT |
| COMMENT |
| COMMENT |

IMAGE CLK

IMAGE DATA

IMAGE DATA

PRINTER
IMAGE DATA
a a1   a2   a3                a4   a5   a6

FAX
IMAGE DATA
b b1              b2      b3   b4

COPY
IMAGE DATA
c c1       c2         c3      c4
LINE SYCN SIGNAL
IMAGE DATA PART
HEADER INFORMATION PART

IMAGE DATA a1  b1  c1  a2  a3  c2  b2   a4  b3  c3  b4  a6  c4

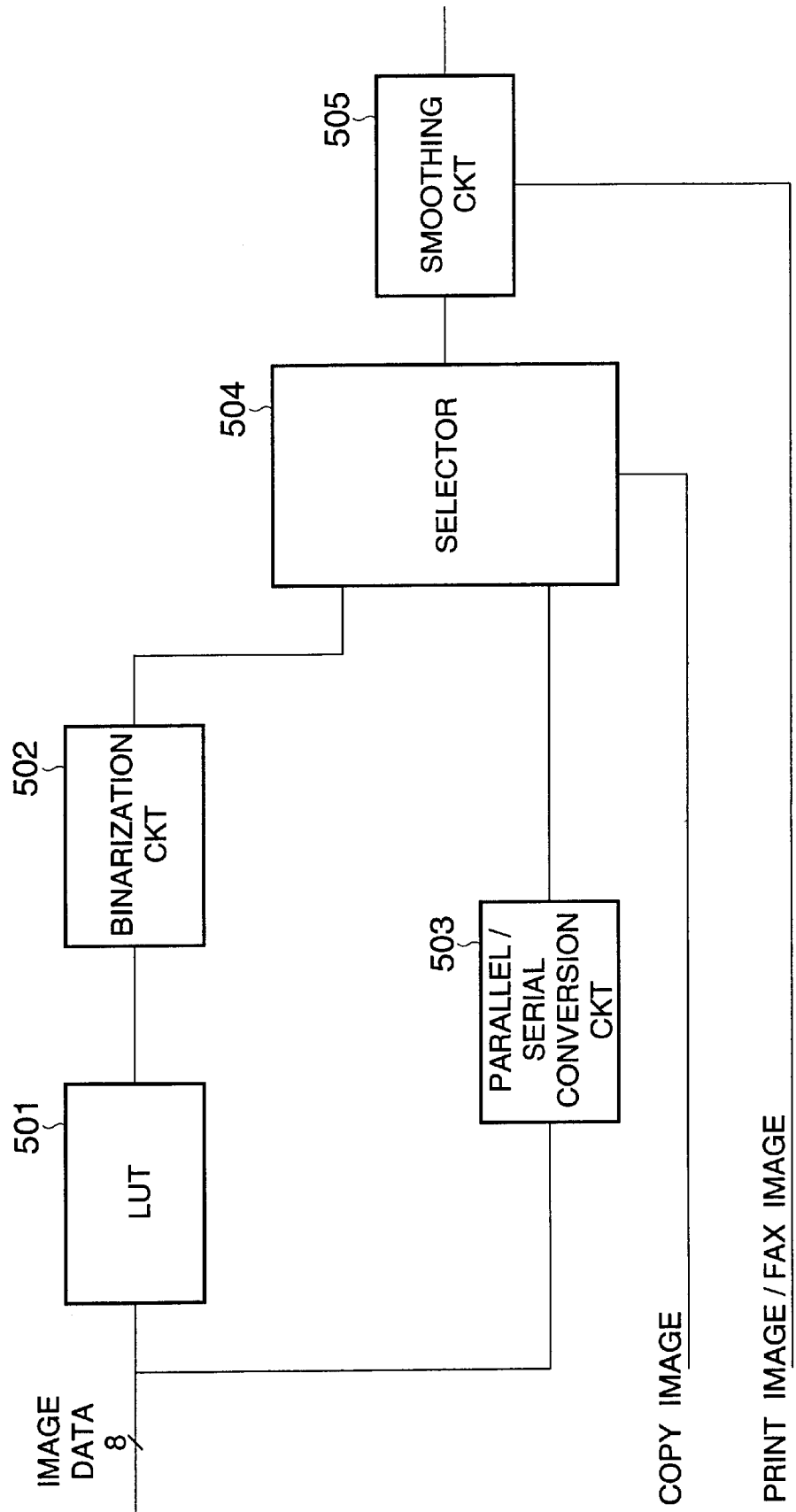

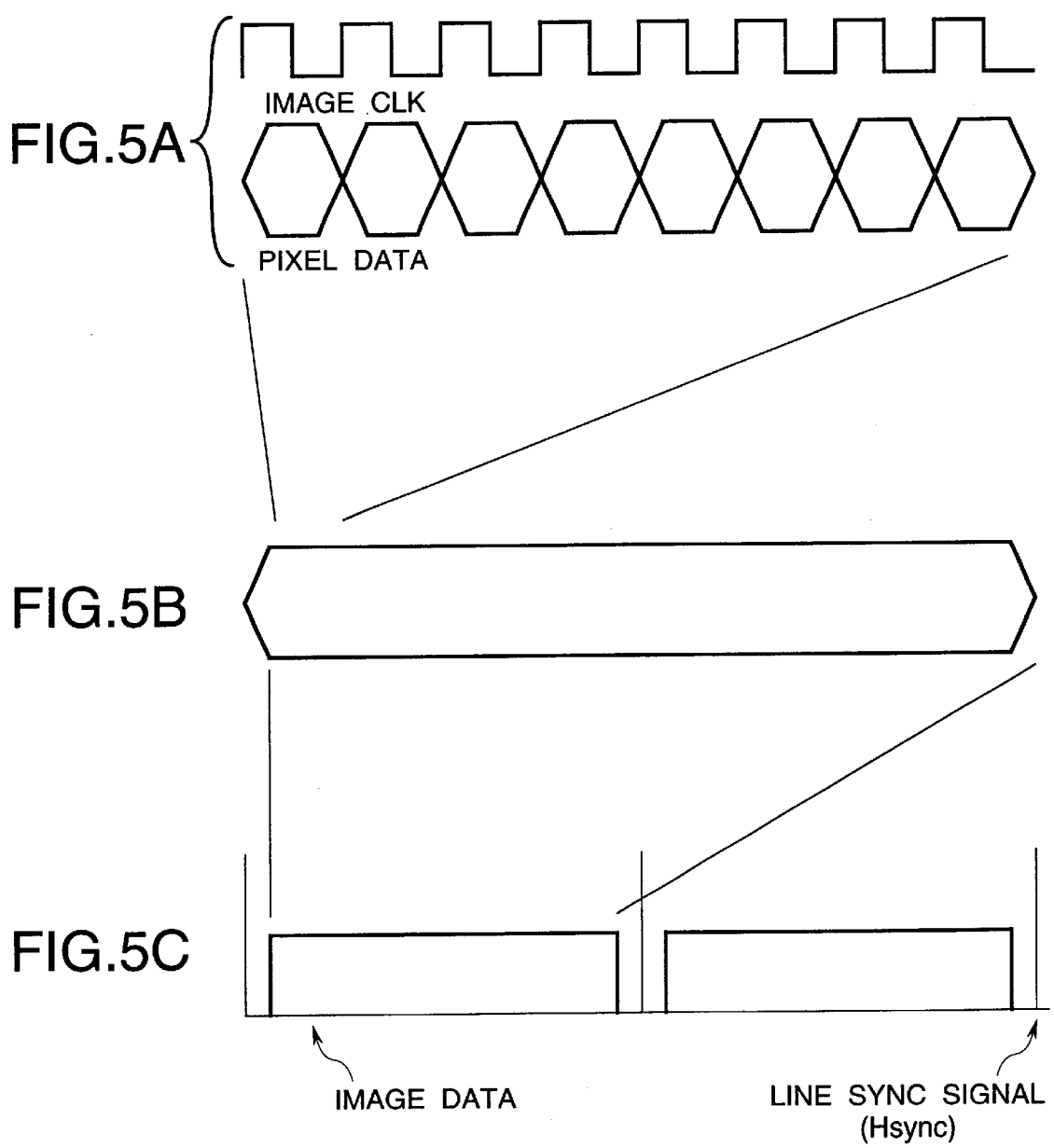

IMAGE PROCESSING METHOD AND APPARATUS

BACKGROUND OF THE INVENTION

1. Field of the Invention

The present invention relates to image processing method and apparatus for managing digital image data, and more particularly to image processing method and apparatus having plural functions such as a copy function, a facsimile function, a print function and the like.

2. Related Background Art

Recently, in respect of an image processing apparatus such as a digital copy machine or the like, a so-called digital multi-functional apparatus having not only the copy function but also the print function and the facsimile function has been developed. Since the digital multi-functional apparatus is the machine to perform a digital image process, such the apparatus can be easily added with the above plural functions. Further, since the multi-functional apparatus can perform the above plural functions by itself, such advantages as saving space and increasing operational efficiency can be derived.

In the digital multi-functional apparatus, generally an image process dedicated digital arithmetic processing unit performs the image process. Such the unit can perform a high-speed process as outputting several tens of images per minute.

However, the above digital arithmetic processing unit has been designed on the premise that it processes sequential image signals to realize high-speed arithmetic processing. Therefore, in such an aspect as performing plural different image processes in parallel, it has been difficult to generalize the above unit.

More particularly, in FIGS. 5A to 5C showing a format of image signal in the image process dedicated digital arithmetic processing unit, FIG. 5A is directed to a data line representing each pixel. In the drawing, each pixel has an information amount of eight bits and is expressed as a signal synchronized with an image clock. FIG. 5B is directed to line data having a certain length in which the respective pixels are linked together. FIG. 5C is directed to a format of image signal under such a situation as each line data is repeated with the same length and at the same timing.

This image signal belongs to a signal system independent of a control signal of a central processing unit (CPU), and does not directly synchronize with a control program of the CPU. Further, an image clock and line data are repeated respectively at remarkably rapid periods, e.g., about 10 MHz in the clock and about 400 micro seconds in the data. Therefore, in order to perform the plural functions in parallel, it is necessary that the CPU changes setting of various parameters concerning the image process for each pixel or each line data. For this reason, since the CPU has terminated the necessary setting before the image process of a first page starts, the CPU ordinarily does not participate in the process itself during image data is actually processed.

Therefore, in case of structuring the multi-functional apparatus as above, it is difficult to simultaneously process the plural functions in parallel. Namely, controllable frequency and precision in setting of the image process are limited, so that there has been such a problem as the process can be changed only in large-job unit such as one-page unit.

If it is intended to smoothly and simultaneously process the plural functions in parallel by avoiding the above problem, it is necessary to provide several circuits having same functions, so that there has been such a problem as a structure of the apparatus becomes more complicated and expensive.

SUMMARY OF THE INVENTION

The present invention has been made in consideration of the above-described problems, and an object thereof is to provide an image processing apparatus in which a process can be smoothly performed as plural functions are appropriately switched, and a structure thereof can be simplified.

An another object of the present invention is to provide image processing method and apparatus in which mutually different image data inputted in parallel to perform plural functions in parallel can be effectively processed with a simple structure.

A still another object of the present invention is to enable to conduct plural functions such as a print function, a facsimile function, a copy function and the like in parallel with a simple structure.

The above objects and effects and further objects and effects of the present invention will become apparent from the following detailed description and the attached drawings.

That is, the present invention provides an image processing method comprising:

- a first input step of inputting first image data to be subjected to a first image process;
- a second input step of inputting second image data to be subjected to a second image process, in parallel with inputting of the first image data;
- an addition step of adding, to the inputted first and second image data, attribute data representing attributes of the respective data;
- a multiplexing step of multiplexing the first and second image data respectively added with the attribute data;
- an analyzing step of analyzing the attribute of the image data on the basis of the attribute data added to the multiplexed image data; and
- a processing step of performing the first image process to the first image data in the multiplexed image data and performing the second image process to the second image data, in accordance with the analyzed attributes.

Also, the present invention provides an image processing apparatus comprising:

- a first input means for inputting first image data to be subjected to a first image process;
- a second input means for inputting second image data to be subjected to a second image process, in parallel with inputting of the first image data by the first input means;
- an addition means for adding, to the first image data inputted by the first input means and the second image data inputted by the second input means, attribute data representing attributes of the respective data;
- a multiplexing means for multiplexing the first and second image data respectively added with the attribute data by the addition means;
- an analyzing means for analyzing the attribute of the image data on the basis of the attribute data added to the image data multiplexed by the multiplexing means; and
- a processing means for performing the first image process to the first image data in the multiplexed image data and performing the second image process to the second image data, in accordance with the attribute analyzed by the analyzing means.

BRIEF DESCRIPTION OF THE DRAWINGS

FIG. 2 shows contents of a header to be added to image data;

FIG. 4 is a block diagram showing an example of structure of an image processing circuit; and FIGS. 5A, 5B and 5C show a format of conventional image data.

DETAILED DESCRIPTION OF THE PREFERRED EMBODIMENT

Figure 1:
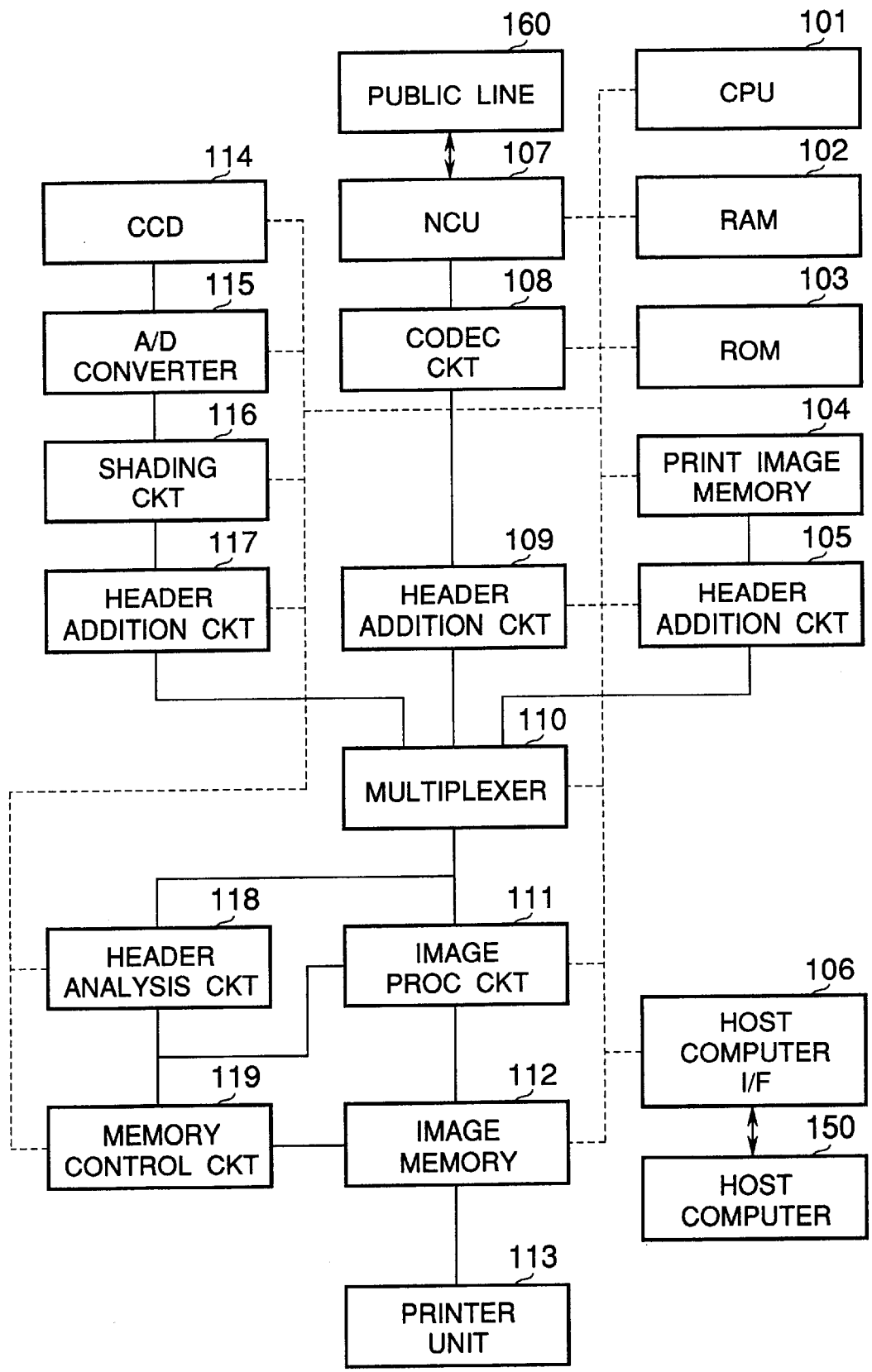
FIG. 1 is a block diagram showing a structure of an image processing apparatus applied to the present invention.

FIG. 1 shows a circuit structure of an image processing apparatus according to the embodiment of the present invention. The image processing apparatus according to the present embodiment is structured by a digital multi-functional apparatus.

This digital multi-functional apparatus has a CPU 101 for controlling each structural part in the digital multi-functional apparatus described later, a working area or the like required in operating a control program, a RAM 102 for storing various data and a ROM 103 for storing the control program, font data or the like. The apparatus also has a print image memory 104 for storing image data, a header addition circuit 105 for adding a header to a head of the image data which is read out from the print image memory 104 and a host computer interface 106 for performing transmission and reception of data with a host computer 150. The apparatus also has a network control unit (NCU) 107 for controlling the transmission and reception of data with a network through a public line 160, a coding/decoding (CODEC) circuit 108 for encoding and decoding data and a header addition circuit 109 for adding a header to a head of facsimile image data which is outputted from the CODEC circuit 108. The apparatus also has a multiplexer 110 for outputting the inputted image data under such a condition as the data is not overlapped time divisionally, an image processing circuit 111 for performing an image process to image data outputted from the multiplexer 110 responding to the image data, an image memory 112 for storing image data, to which an image process is performed, and a printer unit 113 for performing an image formation on the basis of the image data which is read out from the image memory 112. Further, the apparatus has a CCD 114, which is an image sensor, for optically reading an original, an analog-to-digital (A/D) converter 115 for converting an image signal, which is read by the CCD 114, into a digital signal, a shading circuit 116 for performing a shading correction to the image data and a header addition circuit 117 for adding a header to a head of copy image data outputted from the shading circuit 116. Still further, the apparatus has a header analyzing circuit 118 for analyzing header information as discrimination data used in discriminating an attribute (i.e., generation source) of image data outputted from the multiplexer 110 and a memory control circuit 119 for causing the image memory 112 to store the processed image data.

Solid lines shown in FIG. 1 mainly indicate flowing routes of an image signal and a control signal accompanied by the image signal. Dashed lines shown in FIG. 1 mainly indicate routes through which the CPU 101 accesses to registers and memories.

The digital multi-functional apparatus mainly has three basic functions of a print function, a facsimile function and a copy function. A process performed by the digital multi-functional apparatus in case of performing each of the functions will be described hereinbelow.

At first, the print function will be described. This function generates a print image so as to perform an image formation process by analyzing code data used in printing transmitted from the host computer 150.

The digital multi-functional apparatus receives the code data from the host computer 150 through the host computer interface 106. The received code data is once stored in the RAM 102, thereafter, the CPU 101 performs an analyzing in accordance with a predetermined program to generate print image data composed of bit map image in print state. The generated print image data is stored in the print image memory 104.

The CPU 101 performs setting of a header used for a print image to the header addition circuit 105 so as to instruct to start an image transmission when the print image data of predetermined amount is stored in the print image memory 104.

The header addition circuit 105 adds header information, shown in FIG. 2 described later, set by the CPU 101 to a head of block serially adjoining to the print image data and transfers contents of the print image memory 104 to the multiplexer 110 simultaneously. In the multiplexer 110, the header added with print image data is transferred to the image processing circuit 111 and the header analyzing circuit 118.

The header analyzing circuit 118 analyzes the header information, in this case, the information is judged as the print image, and transfers a judgement signal to the image processing circuit 111 and the memory control circuit 119. In accordance with the judgement result of the header analyzing circuit 118, the image processing circuit 111 performs such an image process as a smoothing or the like appropriated to a print output to the print image data extracting a header portion on the basis of setting for the print image among plural settings previously designated so as to transmit the print image data extracting the header to the image memory 112.

In accordance with the judgement result of the header analyzing circuit 118, the memory control circuit 119 performs an operation of storing the print image data processed by the image processing circuit 111 into an area for the print image data within a storage area previously set on the image memory 112. Thereafter, the memory control circuit 119 transfers the print image data from the image memory 112 to the printer unit 113 to terminate the process on performing an image formation.

Subsequently, in the facsimile function, particularly, a process of the digital multi-functional apparatus at the time of the facsimile reception will be described.

At first, after receiving a call reception of facsimile through the NCU 107, the CPU 101 receives facsimile data depending on a predetermined procedure in accordance with the control program. Then, a decoding process is performed to the facsimile data received by the CODEC circuit 108 so as to restore to original facsimile image data composed of bit map image. The facsimile image data, to which the header information used for the facsimile image data previously set by the CPU 101 is added by the header addition circuit 109, is transferred to the multiplexer 110. The multiplexer 110 transfers the header added with facsimile image data to the image processing circuit 111 and the header analyzing circuit 118.

The header analyzing circuit 118 analyzes the header information, in this case, the information is judged as the facsimile image, and transfers a judgement signal to the image processing circuit 111 and the memory control circuit 119. In accordance with the judgement result of the header analyzing circuit 118, the image processing circuit 111 performs such an image process as a smoothing or the like appropriated to a facsimile output to the facsimile image data on the basis of setting for the facsimile image so as to transmit the facsimile image data extracting the header to the image memory 112.

In accordance with the judgement result of the header analyzing circuit 118, the memory control circuit 119 performs an operation of storing the facsimile image data processed by the image processing circuit 111 into an area for the facsimile image data within a storage area previously set on the image memory 112. Thereafter, the memory control circuit 119 transfers the facsimile image data from the image memory 112 to the printer unit 113 to terminate the process on performing an image formation.

Subsequently, a process of the digital multi-functional apparatus at the time of the copy function will be described. At first, the CCD 114 optically scans an original to get an electric signal indicating an image, then the A/D converter 115 converts the electric signal into a digital signal. Then, a shading correction is conducted to the digital signal by the shading circuit 116 so as to obtain the copy image data. The header addition circuit 117 adds the header information, shown in FIG. 2 described later, previously set by the CPU 101 to the copy image data to transfer the copy image data as the header information added with digital signal to the multiplexer 110.

The multiplexer 110 transfers the header added with copy image data to the image processing circuit 111 and the header analyzing circuit 118. The header analyzing circuit 118 analyzes the header information, in this case, the information is judged as the copy image, and transfers a judgement signal to the image processing circuit 111 and the memory control circuit 119.

In accordance with the judgement result of the header analyzing circuit 118, the image processing circuit 111 performs such an image process as a smoothing or the like appropriated to a copy output to the copy image data on the basis of setting for the copy image so as to transmit the copy image data extracting the header to the image memory 112.

In accordance with the judgement result of the header analyzing circuit 118, the memory control circuit 119 performs an operation of storing the copy image data processed by the image processing circuit 111 into an area for the copy image data within a storage area previously set on the image memory 112. Thereafter, the memory control circuit 119 transfers the copy image data from the image memory 112 to the printer unit 113 to terminate the process on performing an image formation.

The processes of the digital multi-functional apparatus in the above three functions have been described. In each of processes, as to the process of performing an actual image formation by transmitting the image data from the image memory 112 to the printer unit 113, since the printer unit 113 can not perform the different three kinds of image formations simultaneously, the process can be switched only by one page unit. However, until the process of adding the header information to the image data depending on each of the functions, the processes of three functions can be performed simultaneously in parallel and it is possible to perform the process in smooth from adding the header information to the image data until storing the image data into an area for each of the functions in the image memory 112 while switching the processes of three functions.

FIG. 2 shows a structure of the header information which indicates various attributes of the image data. The header information is composed of plural byte lines, of which structure includes a header length byte which indicates a scale of the header, two bytes of an image length which indicates a scale of the image data, an image kind information byte which discriminates the print image, the facsimile image and the copy image, an image format byte which indicates a format of the image data, a date information byte which indicates date information and a byte line which adds other comments, thereby enabling to obtain image information. Particularly, until adding the header information to each of the image data, the processes of three functions can be performed simultaneously in parallel as described later by adding the image kind information byte to the image data. From adding the header information to each of the image data until storing each of the image data into the image memory 112, the process can be performed in smooth while switching the three functions.

Figure 3A:
FIGS. 3A, 3B, 3C, 3D, 3E, 3F and 3G show each of image data, to which a multiplexed header is added.
Figure 3B:
Figure 3C:
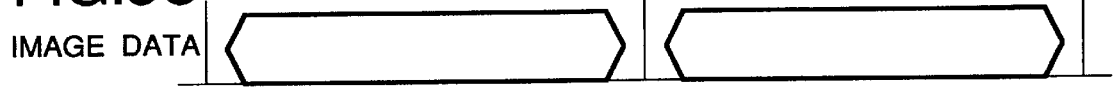

FIGS. 3A to 3G are schematic views showing signals obtained by adding the headers to each of the print image data, the facsimile image data and the copy image data and further multiplexing the three image data by the multiplexer 110. FIG. 3A shows an image clock being a sync signal of each of the image data. FIG. 3B shows a data line indicating each of pixels which has information amount of eight bits every one pixel and is expressed as a signal synchronized with the image clock. FIG. 3C indicates a state of structuring line data having a certain length upon joining each of pixels, that is, a state of before being added with the header information by the header addition circuit and the line data is to be repeated synchronized with cycle of a line sync signal.

Figure 3D:
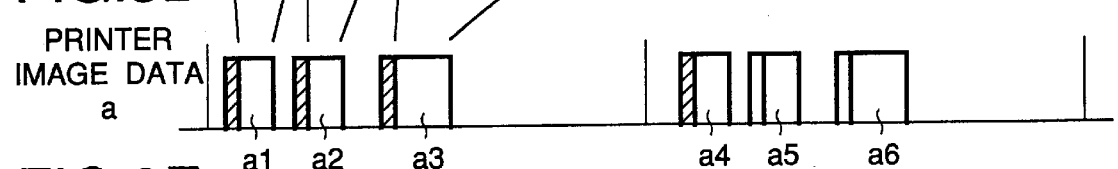

FIG. 3D is a schematic view indicating a state of the image data obtained after the header (oblique line portion in FIG. 3D) is added to the print image data by the header addition circuit 105. In the drawings, there are plural data groups within one line partitioned by the line sync signal. Each data group contains the plural data obtained by dividing the image data of one line and added with the respective headers. In a case where the state in FIG. 3C is converted into the state in FIG. 3D, a non-image part in one line is increased by rising a frequency of the image clock without lowering input speed of the image data, to increase a data amount capable of being managed in one line. The data amount in the group of the image data added with the headers may be a fixed amount or a variable amount as in the drawings.

Figure 3E:
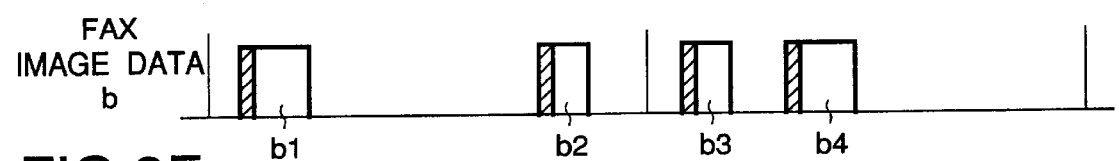
Figure 3F:
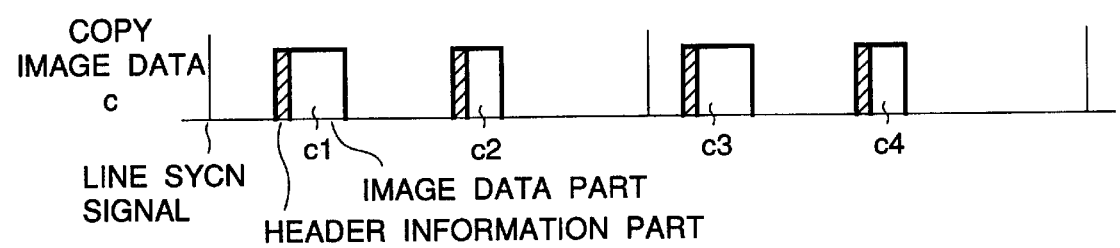
Figure 3G:
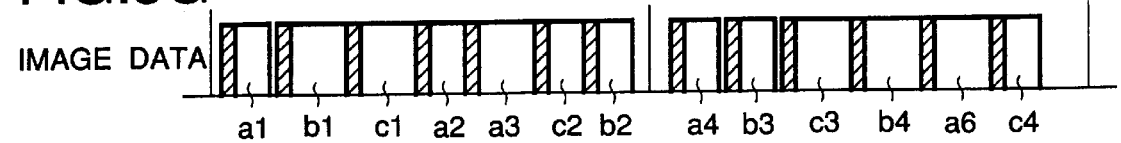

FIGS. 3E and 3F show the facsimile image data and the copy image data passing through the header addition circuits 109 and 117 respectively. FIG. 3G shows a state of a signal which is obtained by multiplexing the three image data added with the header information in the multiplexer 110.

In this case, it has been described that all of the three image data operate line synchronously, but it is possible to once store the processed image data in the image memory 112 and then output it to the printer 113 as the line-sync signal. Therefore, it is unnecessary to always apply the structure that the signal previous to the memory 112 operates based on the line sync signal.

FIG. 4 shows a structure of the image processing circuit 111. The header added with image data outputted from the multiplexer 110 is inputted to an LUT 501 and a parallel/serial conversion circuit 503. The LUT 501 is a look up table for performing a gamma conversion to the copy image data so as to take a matching between an image reading characteristic depending on the CCD 114 and an image recording characteristic depending on the printer unit 113. A binarization circuit 502 binarizes multi-value image data. The parallel/serial conversion circuit 503 restores the data, which is transmitted in a format of parallel data with a unit of eight pixels as the facsimile image data and the print image data among binary data, to one bit data of each pixel unit. A selector 504 is a circuit for selecting either binarized copy image data or parallel/serial converted binary data. A smoothing circuit 505 used for the print image and the facsimile image performs a process of smoothing the image data so as to decrease a jaggy appeared in oblique lines or the like by detecting dots arrangement in pixel data. Operations of the selector 504 and the smoothing circuit 505 are controlled by three kinds of signals of the copy image, the print image and the facsimile image, which are signals obtained upon analyzing the headers added to each of the image data by the header analyzing circuit 118.

Further, in a case where the image data is the copy image, an output from the binarization circuit 502 is selected by the selector 504. In a case where the image data is not the copy image, an output from the parallel/serial conversion circuit 503 is selected by the selector 504. In a case where the image data is the print image or the facsimile image, a smoothing process is performed to the image data, which is selected by the selector 504, by the smoothing circuit 505.

The smoothing circuit 505 can perform two ways of the smoothing processes, that is, the smoothing process for the print image and the smoothing process for the facsimile image. These processes can be switched in accordance with a condition whether the image data is the print image or the facsimile image.

In a case where the image data is the copy image, the smoothing circuit 505 outputs the inputted image data as it is without performing any process.

The image data outputted from the smoothing circuit 505 is stored in a predetermined area of the image memory 112 under a control of the memory control circuit 119.

As described above, an image process, which corresponds to each of the image data, can be performed to the three kinds of image data, that is, the print image data, the facsimile image data and the copy image data, upon switching every data of a small unit without switching every job unit. Therefore, plural functions can be performed in parallel. It should be noted that the similar process can be performed to not only all of the three kinds of image data but one kind or two kinds of image data.

In the present embodiment, an independent process every each of data can be performed and also, as to the length of one line, a process for not only the total length of the line but a part of divided several portions of the line is performed, that is, a process every each of pixels can be performed by using the image data having the header information as shown in FIG. 3G. Therefore, not only a process with one page unit but various processes every each of pixels can be performed.

In the present embodiment, in case of operating a transmission function and the print function in the facsimile function simultaneously, the header information is added to the print image at the header addition circuit 105 as described above to store the print image data into the image memory 112. On the other hand, the header information is added to a signal of original image, which is scanned by the CCD 114, at the header addition circuit 117 to generate binarized image data used for a facsimile transmission as scan image data at the image processing circuit 111 to be stored into an area for facsimile transmission image data in the image memory 112. Thereafter, the print image data is transmitted to the printer unit 113 and the facsimile transmission image data is read out by the CPU 101 and is encoded by the CODEC circuit 108 to be transmitted to the public line 160 through the NCU 107 so as to perform each of the processes. In this manner, although in a case where the digital multi-functional apparatus has plural output destinations, the processes can be performed in parallel by adding the header information to the image data.

As described above, in the present embodiment, the digital multi-functional apparatus obtains image signals from the host computer interface 106, the NCU 107 and the CCD 114. The process such as a shading correction or the like is performed to each of these image signals which is managed as the image data, to which the header information is added by any circuit of the header addition circuit 105, 109 and 117. The header analyzing circuit 118 analyzes the header information. In accordance with the analyzed result, the image processing circuit 111 performs an appropriate image process to each of the image data, that is, the print image data, the facsimile image data or the copy image data. Each of the processed image data is stored into an area for each of the image data on the image memory 112 to transfer the image data to the printer unit 113 so as to perform an image formation. In this manner, until the process of adding the header information to each of the image data, the processes of three functions can be performed simultaneously in parallel. From adding the header information to each of the image data until storing each of the image data into the image memory 112, the process can be performed in smooth while switching the three functions. Further, plural the image processing circuits 111, the image memories 112 or the like are not required. As a result, a structure of the digital multi-functional apparatus can be simplified.

In the present embodiment, as the image processes, the gamma conversion, the binarization, the serial/parallel conversion and the smoothing process are described by way of example. However, the image processes are not limited to them, but may apply processes such as image zooming, image rotating and the like. Further, an image processing area in the image processing circuit 111 can be changed according to a kind of the image data by adding recording paper size information to which the image data is outputted, to the header information.

Further, in the present embodiment, only one printer unit 113 is provided. However, the output destinations of the image data can be determined by providing the plural printer units 113 and also adding the output destinations of the image data to the header information.

Furthermore, although the header information is added to the image data in the present embodiment, also footer information may be added thereto.

As above, the present invention has been explained with reference to the preferred embodiment. However, the present invention is not limited to this, and various modifications are possible within the spirit and scope of the appended claims.

What is claimed is:

1. An image processing method comprising:
   a first input step of inputting first image data to be subjected to a first image process;
   a second input step of inputting second image data to be subjected to a second image process, in parallel with inputting of the first image data;
   an addition step of adding, to the inputted first and second image data, attribute data representing attributes of the respective data;

a multiplexing step of multiplexing the first and second image data respectively added with the attribute data;

an analyzing step of analyzing the attribute of the image data on the basis of the attribute data added to the multiplexed image data; and a processing step of performing the first image process to the first image data in the multiplexed image data and performing the second image process to the second image data, in accordance with the analyzed attributes.

2. A method according to claim 1, wherein the first and second image data added with the attribute data are time-divisionally multiplexed in said multiplex step.

3. A method according to claim 1, wherein the first image process or the second image process is selected in accordance with the analyzed attribute in said processing step.

4. A method according to claim 1, further comprising a storing step of storing the first image data subjected to the first image process and the second image data subjected to the second image process, respectively into predetermined areas of a memory in said processing step.

5. A method according to claim 4, further comprising a control step of controlling an image data storing area in accordance with the analyzed attribute.

6. A method according to claim 1, wherein the input image data is divided into plural blocks, and the attribute data is added to each block in said addition step.

7. An image processing apparatus comprising:

first input means for inputting first image data to be subjected to a first image process;

second input means for inputting second image data to be subjected to a second image process, in parallel with inputting of the first image data by said first input means;

addition means for adding, to the first image data inputted by said first input means and the second image data inputted by said second input means, attribute data representing attributes of the respective data;

multiplexing means for multiplexing the first and second image data respectively added with the attribute data by said addition means;

analyzing means for analyzing the attribute of the image data on the basis of the attribute data added to the image data multiplexed by said multiplexing means; and processing means for performing the first image process to the first image data in the multiplexed image data and performing the second image process to the second image data, in accordance with the attribute analyzed by said analyzing means.

8. An apparatus according to claim 7, wherein said multiplexing means time-divisionally multiplexes the first and second image data respectively added with the attribute data.

9. An apparatus according to claim 7, wherein said processing means selects the first image process or the second image process in accordance with the analyzed attribute.

10. An apparatus according to claim 7, further comprising storing means for storing the first image data subjected to the first image process by said processing means and the second image data subjected to the second image process by said processing means, respectively into predetermined areas.

11. An apparatus according to claim 10, further comprising control means for controlling a storing area of the image data in said storing means, in accordance with the analyzed attribute.

12. An apparatus according to claim 7, wherein said addition means divides the inputted image data into plural blocks and adds the attribute data to each block.

* * * * *